United States Patent
Fripp et al.

(10) Patent No.: US 10,125,565 B2
(45) Date of Patent: Nov. 13, 2018

(54) DISSOLVABLE ISOLATION DEVICES WITH AN ALTERED SURFACE THAT DELAYS DISSOLUTION OF THE DEVICES

(71) Applicant: Halliburton Energy Services, Inc., Houston, TX (US)

(72) Inventors: Michael L. Fripp, Carrollton, TX (US); Zachary W. Walton, Carrollton, TX (US); Zachary R. Murphree, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/655,039

(22) PCT Filed: Jun. 23, 2014

(86) PCT No.: PCT/US2014/043709
§ 371 (c)(1),
(2) Date: Jun. 23, 2015

(87) PCT Pub. No.: WO2015/199649
PCT Pub. Date: Dec. 30, 2015

(65) Prior Publication Data
US 2017/0314359 A1 Nov. 2, 2017

(51) Int. Cl.
*E21B 33/12* (2006.01)
*E21B 43/16* (2006.01)
(Continued)

(52) U.S. Cl.
CPC ............ *E21B 33/1208* (2013.01); *C09K 8/02* (2013.01); *E21B 23/04* (2013.01); *E21B 34/08* (2013.01);
(Continued)

(58) Field of Classification Search
CPC ...... E21B 34/08; E21B 43/14; E21B 33/1208; E21B 43/16; E21B 43/28; E21B 23/04; C09K 8/02
See application file for complete search history.

(56) References Cited

U.S. PATENT DOCUMENTS 9,068,428 B2 * 6/2015 Mazyar ................. E21B 33/12
9,739,107 B2 * 8/2017 Desai ...................... E21B 29/02
(Continued)

FOREIGN PATENT DOCUMENTS

CA 2833981 A1 11/2012
JP 2014-036224 A 2/2014
(Continued)

OTHER PUBLICATIONS

Canadian Office Action dated Apr. 20, 2017; Canadian Application No. 2,939,230.
(Continued)

*Primary Examiner* — James G Sayre
(74) *Attorney, Agent, or Firm* — McGuire Woods LLP (57) ABSTRACT

A wellbore isolation device comprising: a material that dissolves via corrosion when in contact with a wellbore fluid, a surface of the material, wherein the surface of the material is altered via a surface treatment, and wherein the altered surface delays corrosion of the material for a desired amount of time. A method of removing the wellbore isolation device comprising: contacting or allowing the wellbore isolation device to come in contact with a wellbore fluid; and causing or allowing at least the portion of the material to dissolve.

17 Claims, 6 Drawing Sheets

(51) Int. Cl.
      *E21B 43/14*          (2006.01)
      *E21B 34/08*          (2006.01)
      *E21B 23/04*          (2006.01)
      *E21B 43/28*          (2006.01)
      *C09K 8/02*           (2006.01)

(52) U.S. Cl.
      CPC .............. *E21B 43/14* (2013.01); *E21B 43/16* (2013.01); *E21B 43/28* (2013.01)

(56) References Cited

U.S. PATENT DOCUMENTS

| | | |
|---|---|---|
| 2011/0315444 A1 | 12/2011 | Trinh et al. |
| 2012/0276356 A1* | 11/2012 | Xu .......................... E21B 41/00 428/218 |
| 2013/0160992 A1* | 6/2013 | Agrawal ................. E21B 23/04 166/193 |
| 2013/0192982 A1 | 8/2013 | Watson et al. |
| 2013/0327540 A1 | 12/2013 | Hamid et al. |

FOREIGN PATENT DOCUMENTS

| | | |
|---|---|---|
| KR | 10-2011-0047568 A | 5/2011 |
| WO | 2013022635 A2 | 2/2013 |

OTHER PUBLICATIONS

European Search Report dated Oct. 11, 2017; European Application No. 14895507.3.
International Search Report and Written Opinion dated Mar. 25, 2015; PCT International Application No. PCT/US14/043709.

\* cited by examiner

DISSOLVABLE ISOLATION DEVICES WITH AN ALTERED SURFACE THAT DELAYS DISSOLUTION OF THE DEVICES

TECHNICAL FIELD

An isolation device and methods of removing the isolation device are provided. The isolation device includes at least an anode that is capable of dissolving via galvanic corrosion. The isolation device includes a passivation layer to help control the dissolution rate of the anode. According to an embodiment, the isolation device is used in an oil or gas well operation.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more materials, layers, isolation devices, wellbore intervals, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is not uncommon for a wellbore to extend several hundreds of feet or several thousands of feet into a subterranean formation. The subterranean formation can have different zones. A zone is an interval of rock differentiated from surrounding rocks on the basis of its fossil content or other features, such as faults or fractures. For example, one zone can have a higher permeability compared to another zone. It is often desirable to treat one or more locations within multiples zones of a formation. One or more zones of the formation can be isolated within the wellbore via the use of an isolation device to create multiple wellbore intervals. At least one wellbore interval corresponds to a formation zone. The isolation device can be used for zonal isolation and functions to block fluid flow within a tubular, such as a tubing string, or within an annulus. The blockage of fluid flow prevents the fluid from flowing across the isolation device in any direction and isolates the zone of interest. In this manner, treatment techniques can be performed within the zone of interest.

Common isolation devices include, but are not limited to, a ball and a seat, a bridge plug, a frac plug, a packer, a plug, and wiper plug. It is to be understood that reference to a "ball" is not meant to limit the geometric shape of the ball to spherical, but rather is meant to include any device that is capable of engaging with a seat. A "ball" can be spherical in shape, but can also be a dart, a bar, or any other shape. Zonal isolation can be accomplished via a ball and seat by dropping or flowing the ball from the wellhead onto the seat that is located within the wellbore. The ball engages with the seat, and the seal created by this engagement prevents fluid communication into other wellbore intervals downstream of the ball and seat. As used herein, the relative term "downstream" means at a location further away from a wellhead. In order to treat more than one zone using a ball and seat, the wellbore can contain more than one ball seat. For example, a seat can be located within each wellbore interval. Generally, the inner diameter (I.D.) of the ball seats is different for each zone. For example, the I.D. of the ball seats sequentially decreases at each zone, moving from the wellhead to the bottom of the well. In this manner, a smaller ball is first dropped into a first wellbore interval that is the farthest downstream; the corresponding zone is treated; a slightly larger ball is then dropped into another wellbore interval that is located upstream of the first wellbore interval; that corresponding zone is then treated; and the process continues in this fashion—moving upstream along the wellbore—until all the desired zones have been treated. As used herein, the relative term "upstream" means at a location closer to the wellhead.

A bridge plug and frac plug is composed primarily of slips, a plug mandrel, and a rubber sealing element. A bridge plug and frac plug can be introduced into a wellbore and the sealing element can be caused to block fluid flow into downstream intervals. A packer generally consists of a sealing device, a holding or setting device, and an inside passage for fluids. A packer can be used to block fluid flow through the annulus located between the outside of a tubular and the wall of the wellbore or inside of a casing.

Isolation devices can be classified as permanent or retrievable. While permanent isolation devices are generally designed to remain in the wellbore after use, retrievable devices are capable of being removed after use. It is often desirable to use a retrievable isolation device in order to restore fluid communication between one or more wellbore intervals. Traditionally, isolation devices are retrieved by inserting a retrieval tool into the wellbore, wherein the retrieval tool engages with the isolation device, attaches to the isolation device, and the isolation device is then removed from the wellbore. Another way to remove an isolation device from the wellbore is to mill at least a portion of the device or the entire device. Yet, another way to remove an isolation device is to contact the device with a solvent, such as an acid, thus dissolving all or a portion of the device.

However, some of the disadvantages to using traditional methods to remove a retrievable isolation device include: it can be difficult and time consuming to use a retrieval tool; milling can be time consuming and costly; and premature dissolution of the isolation device can occur. For example, premature dissolution can occur if acidic fluids are used in the well prior to the time at which it is desired to dissolve the isolation device. Therefore, it is becoming increasingly worthy to utilize retrievable isolation devices. One way to retrieve an isolation device is to make all or a portion of the device from a material that can undergo galvanic corrosion.

Galvanic corrosion occurs when two different materials, such as metals or metal alloys are in electrical connectivity with each other and both are in contact with an electrolyte. As used herein, the phrase "electrical connectivity" means that the two different materials, such as metals or metal alloys are either touching or in close enough proximity to each other such that when the two different materials are in contact with an electrolyte, the electrolyte becomes electrically conductive and ion migration occurs between one of the materials and the other material, and is not meant to require an actual physical connection between the two different materials, for example, via a metal wire. It is to be understood that as used herein, the term "metal" is meant to include pure metals and also metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin. It is also possible for certain metal alloys, such as a metal alloy containing at least 50% magnesium to undergo galvanic corrosion without a distinct cathode being present when the alloy is in contact with an electrolyte. As used herein, the term "galvanic corrosion" also includes "micro-galvanic corrosion" where the anode and cathode are part of the metal alloy. The term galvanic corrosion is also intended to cover applications where there are distinct regions of anodic and cathodic materials within the metal.

The material that is less noble, compared to the other material, will dissolve in the electrolyte. The less noble material is often referred to as the anode, and the more noble material is often referred to as the cathode. The anode and the cathode can form a galvanic couple. Galvanic corrosion is an electrochemical process whereby free ions in the electrolyte make the electrolyte electrically conductive, thereby providing a means for ion migration from the anode to the cathode—resulting in deposition formed on the cathode. Materials can be arranged in a galvanic series. The galvanic series lists materials in order of the most noble to the least noble. An anodic index lists the electrochemical voltage (V) that develops between a material and a standard reference electrode (gold (Au)) in a given electrolyte. The actual electrolyte used can affect where a particular material appears on the galvanic series and can also affect the electrochemical voltage. For example, the dissolved oxygen content in the electrolyte can dictate where the metal or metal alloy appears on the galvanic series and the metal's electrochemical voltage. The anodic index of gold is −0 V; while the anodic index of beryllium is −1.85 V. A material that has an anodic index greater than another material is more noble than the other material and will function as the cathode. Conversely, the material that has an anodic index less than another material is less noble and functions as the anode. In order to determine the relative voltage between two different materials, the anodic index of the lesser noble material is subtracted from the other material's anodic index, resulting in a positive value.

There are several factors that can affect the rate of galvanic corrosion. One of the factors is the distance separating the materials on the galvanic series chart or the difference between the anodic indices of the materials. For example, beryllium is one of the last materials listed at the least noble end of the galvanic series and platinum is one of the anodes listed at the most noble end of the series. By contrast, tin is listed directly above lead on the galvanic series. Using the anodic index of materials, the difference between the anodic index of gold and beryllium is 1.85 V; whereas, the difference between tin and lead is 0.05 V. This means that galvanic corrosion will occur at a much faster rate for magnesium or beryllium and gold compared to lead and tin.

The following is a partial galvanic series chart using a deoxygenated sodium chloride water solution as the electrolyte. The materials are listed in descending order from the most noble (cathodic) to the least noble (anodic). The following list is not exhaustive, and one of ordinary skill in the art is able to find where a specific material, metal, or metal alloy is listed on a galvanic series in a given electrolyte.

PLATINUM
GOLD
ZIRCONIUM
GRAPHITE
SILVER
CHROME IRON
SILVER SOLDER
COPPER-NICKEL ALLOY 80-20
COPPER-NICKEL ALLOY 90-10
MANGANESE BRONZE (CA 675), TIN BRONZE (CA903, 905)
COPPER (CA102)
BRASSES
NICKEL (ACTIVE)
TIN
LEAD
ALUMINUM BRONZE
STAINLESS STEEL
CHROME IRON
MILD STEEL (1018), WROUGHT IRON
ALUMINUM 2117, 2017, 2024
CADMIUM
ALUMINUM 5052, 3004, 3003, 1100, 6053
ZINC
MAGNESIUM
BERYLLIUM

The following is a partial anodic index listing the voltage of a listed material against a standard reference electrode (gold) using a deoxygenated sodium chloride water solution as the electrolyte. The materials are listed in descending order from the greatest voltage (most cathodic) to the least voltage (most anodic). The following list is not exhaustive, and one of ordinary skill in the art is able to find the anodic index of a specific material in a given electrolyte.

Anodic index

| Metal | Index (V) |
|---|---|
| Gold, solid and plated, Gold-platinum alloy | −0.00 |
| Rhodium plated on silver-plated copper | −0.05 |
| Silver, solid or plated; monel metal; high nickel-copper alloys | −0.15 |
| Nickel, solid or plated, titanium and alloys, monel | −0.30 |
| Copper, solid or plated; low brasses or bronzes; silver solder; German silvery high copper-nickel alloys; nickel-chromium alloys | −0.35 |
| Brass and bronzes | −0.40 |
| High brasses and bronzes | −0.45 |
| 18% chromium type corrosion-resistant steels | −0.50 |
| Chromium plated; tin plated; 12% chromium type corrosion-resistant steels | −0.60 |
| Tin-plate; tin-lead solder | −0.65 |
| Lead, solid or plated; high lead alloys | −0.70 |
| 2000 series wrought aluminum | −0.75 |
| Iron, wrought, gray or malleable, plain carbon and low alloy steels | −0.85 |
| Aluminum, wrought alloys other than 2000 series aluminum, cast alloys of the silicon type | −0.90 |
| Aluminum, cast alloys other than silicon type, cadmium, plated and chromate | −0.95 |
| Hot-dip-zinc plate; galvanized steel | −1.20 |
| Zinc, wrought; zinc-base die-casting alloys; zinc plated | −1.25 |
| Magnesium & magnesium-base alloys, cast or wrought | −1.75 |
| Beryllium | −1.85 |

Another factor that can affect the rate of galvanic corrosion is the temperature and concentration of the electrolyte. The higher the temperature and concentration of the electrolyte, generally the faster the rate of corrosion. Yet another factor that can affect the rate of galvanic corrosion is the total amount of surface area of the least noble (anodic material). The greater the surface area of the anode that can come in contact with the electrolyte, the faster the rate of corrosion. The cross-sectional size of the anodic material pieces can be decreased in order to increase the total amount of surface area per total volume of the material. The anodic metal or metal alloy can also be a matrix in which pieces of cathode material is embedded in the anode matrix. Yet another factor that can affect the rate of galvanic corrosion is the ambient pressure. Depending on the electrolyte chemistry and the two materials, the corrosion rate can be slower at higher pressures than at lower pressures if gaseous components are generated. Yet another factor that can affect the rate of galvanic corrosion is the physical distance between the two different metal and/or metal alloys of the galvanic system.

A degradable isolation device, such as a ball and baffle, should be able to withstand a pressure differential for a desired amount of time once the device has been positioned within a wellbore. For example, it is expected that a ball is capable of maintaining zonal isolation for a desired period of time after landing on a baffle by creating a seal with the baffle. Depending on the materials used to create the dissolvable portion of the device, the rate of corrosion can be too fast for the device to maintain zonal isolation for the desired period of time. Therefore, a coating may be applied to the surface of the dissolvable portion of the device to delay corrosion of the anode. For example, a wax or other material may be applied to the surface of the device.

However, some issues can arise with the use of coatings. These coatings traditionally are not chemically bonded to the surface of the device. Devices that utilize a coating can experience coatings that become detached from the device onto which they were coated or the coating can be structurally weaker than the materials making up the isolation device. When the coatings are weaker, then structural integrity issues, such as cracking can occur, which can lead to a faster galvanic reaction than was desired. Other integrity issues can include the holding strength or ability to withstand a pressure differential for the desired period of time can decrease.

It is desirable for improved means for delaying the onset of corrosion of degradable isolation devices. A novel isolation device includes a surface that has been treated via a chemical or physical means to alter the surface of the device. The altered surface is more resistant to corrosion, thereby serving as an initial delay for corrosion of the dissolvable portion of the device underneath the surface.

According to an embodiment, a wellbore isolation device comprises: a material that dissolves via corrosion when in contact with a wellbore fluid, a surface of the material, wherein the surface of the material is altered via a surface treatment, and wherein the altered surface delays corrosion of the material for a desired amount of time.

According to another embodiment, a method of removing the wellbore isolation device comprising: contacting or allowing the wellbore isolation device to come in contact with electrolyte wellbore fluid; and causing or allowing at least the portion of the material to dissolve.

ANY DISCUSSION OF THE EMBODIMENTS REGARDING THE ISOLATION DEVICE OR ANY COMPONENT RELATED TO THE ISOLATION DEVICE (E.G., THE ELECTROLYTE) IS INTENDED TO APPLY TO ALL OF THE APPARATUS AND METHOD EMBODIMENTS.

Figure 1:
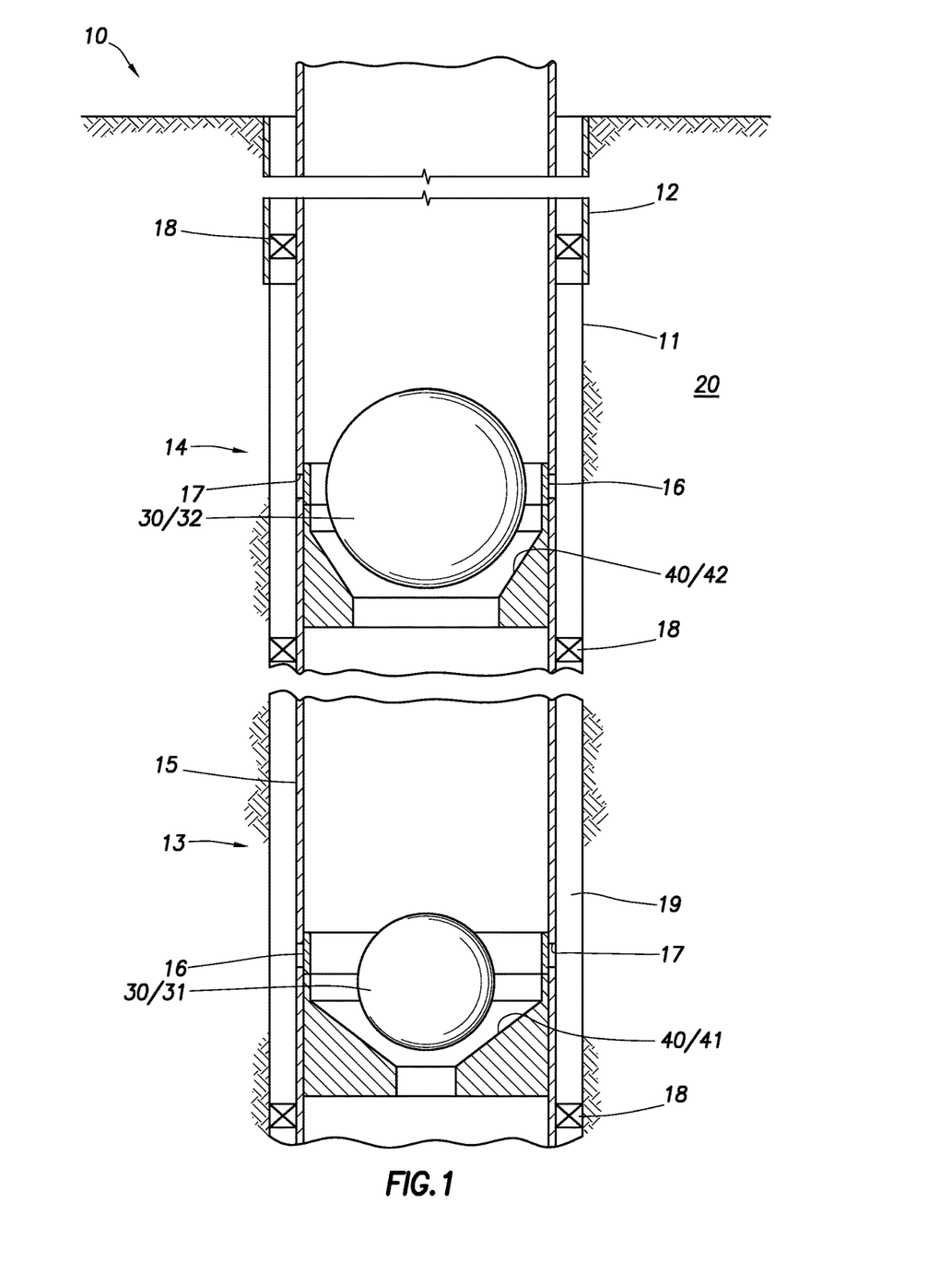
FIG. 1 depicts a well system containing more than one isolation device.

Turning to the Figures, FIG. 1 depicts a well system 10. The well system 10 can include at least one wellbore 11. The wellbore 11 can penetrate a subterranean formation 20. The subterranean formation 20 can be a portion of a reservoir or adjacent to a reservoir. The wellbore 11 can include a casing 12. The wellbore 11 can include only a generally vertical wellbore section or can include only a generally horizontal wellbore section. A tubing string 15 can be installed in the wellbore 11. The well system 10 can comprise at least a first wellbore interval 13 and a second wellbore interval 14. The well system 10 can also include more than two wellbore intervals, for example, the well system 10 can further include a third wellbore interval, a fourth wellbore interval, and so on. At least one wellbore interval can correspond to a zone of the subterranean formation 20. The well system 10 can further include one or more packers 18. The packers 18 can be used in addition to the isolation device to create the wellbore intervals and isolate each zone of the subterranean formation 20. The isolation device can be the packers 18. The packers 18 can be used to prevent fluid flow between one or more wellbore intervals (e.g., between the first wellbore interval 13 and the second wellbore interval 14) via an annulus 19. The tubing string 15 can also include one or more ports 17. One or more ports 17 can be located in each wellbore interval. Moreover, not every wellbore interval needs to include one or more ports 17. For example, the first wellbore interval 13 can include one or more ports 17, while the second wellbore interval 14 does not contain a port. In this manner, fluid flow into the annulus 19 via the ports 17 for a particular wellbore interval can be selected based on the specific oil or gas operation.

It should be noted that the well system 10 is illustrated in the drawings and is described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, the well system 10 can further include a well screen. By way of another example, cement may be used instead of packers 18 to aid the isolation device in providing zonal isolation. Cement may also be used in addition to packers 18.

According to an embodiment, the isolation device is capable of restricting or preventing fluid flow between a first wellbore interval 13 and a second wellbore interval 14. The first wellbore interval 13 can be located upstream or downstream of the second wellbore interval 14. In this manner, depending on the oil or gas operation, fluid is restricted or prevented from flowing downstream or upstream into the second wellbore interval 14. Examples of isolation devices capable of restricting or preventing fluid flow between zones include, but are not limited to, a ball and a ball seat, a plug, a bridge plug, a wiper plug, a frac plug, a packer, and a plug in a base pipe. The portion of the isolation device that comprises the material can be the mandrel of a packer or plug, a spacer ring, a slip, a wedge, a retainer ring, an extrusion limiter or backup shoe, a mule shoe, a ball, a flapper, a ball seat, a sleeve, or any other downhole tool or component of a downhole tool used for zonal isolation.

As depicted in the drawings, the isolation device can be a ball 30 (e.g., a first ball 31 or a second ball 32) and a seat 40 (e.g., a first seat 41 or a second seat 42). The ball 30 can engage the seat 40. The seat 40 can be located on the inside of a tubing string 15. The inner diameter (I.D.) of the first seat 41 can be less than the I.D. of the second seat 42. In this manner, a first ball 31 can be dropped or flowed into wellbore. The first ball 31 can have a smaller outer diameter (O.D.) than the second ball 32. The first ball 31 can engage the first seat 41. Fluid can now be temporarily restricted or prevented from flowing into any wellbore intervals located downstream of the first wellbore interval 13. In the event it is desirable to temporarily restrict or prevent fluid flow into any wellbore intervals located downstream of the second wellbore interval 14, then the second ball 32 can be dropped or flowed into the wellbore and will be prevented from falling past the second seat 42 because the second ball 32 has a larger O.D. than the I.D. of the second seat 42. The second ball 32 can engage the second seat 42. The ball (whether it be a first ball 31 or a second ball 32) can engage a sliding sleeve 16 during placement. This engagement with the sliding sleeve 16 can cause the sliding sleeve to move; thus, opening a port 17 located adjacent to the seat. The port 17 can also be opened via a variety of other mechanisms instead of a ball. The use of other mechanisms may be advantageous when the isolation device is not a ball. After placement of the isolation device, fluid can be flowed from, or into, the subterranean formation 20 via one or more opened ports 17 located within a particular wellbore interval. As such, a fluid can be produced from the subterranean formation 20 or injected into the formation.

The methods include contacting or allowing the wellbore isolation device to come in contact with electrolyte wellbore fluid, wherein the isolation device comprises a material that dissolves via corrosion when in contact with the wellbore fluid. The wellbore fluid can be an electrolyte. As used herein, an electrolyte is any substance containing free ions (i.e., a positive- or negative-electrically charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include sodium ($Na^+$), potassium ($K^+$), calcium ($Ca^{2+}$), magnesium ($Mg^{2+}$), chloride ($Cl^-$), hydrogen phosphate ($HPO_4^{2-}$), and hydrogen carbonate ($HCO_3^-$). The electrolyte can be a fluid that is introduced into the wellbore. The wellbore fluid or electrolyte can also be a reservoir fluid. The methods can include contacting or allowing the device to come in contact with two or more electrolytes. If more than one electrolyte is used, the free ions in each electrolyte can be the same or different. A first electrolyte can be, for example, a stronger electrolyte compared to a second electrolyte. Furthermore, the concentration of each electrolyte can be the same or different. It is to be understood that when discussing the concentration of an electrolyte, it is meant to be a concentration prior to contact with the material, as the concentration of free ions will decrease during the galvanic corrosion reaction.

The concentration (i.e., the total number of free ions available in the electrolyte) of the electrolyte can be adjusted to control the rate of dissolution of the material. According to an embodiment, the concentration of the electrolyte is selected such that at least a portion of the material dissolves in a desired amount of time. If more than one electrolyte is used, then the concentration of the electrolytes is selected such that at least a portion of the material dissolves in the desired amount of time. The concentration can be determined based on at least the specific metals or metal alloys selected for the material and the bottomhole temperature of the well. Moreover, because the free ions in the electrolyte enable the electrochemical reaction to occur by donating its free ions, the number of free ions will decrease as the reaction occurs. At some point, the electrolyte may be depleted of free ions if there is any remaining material that has not dissolved. If this occurs, the galvanic corrosion that causes the material to dissolve will stop. In this example, it may be necessary to cause or allow the isolation device to come in contact with a second, third, or fourth, and so on, electrolyte.

The step of causing can include introducing the wellbore fluid or electrolyte into the wellbore. The step of allowing can include allowing a reservoir fluid to come in contact with the isolation device, wherein the reservoir fluid is the wellbore fluid or electrolyte.

Figure 2:
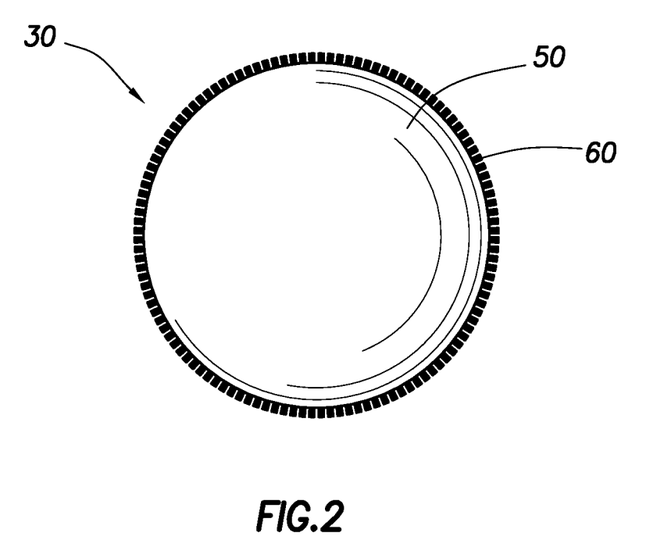
FIG. 2 depicts an isolation device of a metal alloy.

The corrosion can be galvanic corrosion. Referring to FIG. 2, the material that undergoes galvanic corrosion when in contact with the electrolyte is a metal alloy 50. According to this embodiment, the metal alloy 50 can undergo galvanic corrosion in the presence of the electrolyte without a distinct cathode being present. According to certain embodiments, the metal alloy 50 comprises magnesium as the metal. The magnesium can be at a concentration of at least 50% by volume of the metal alloy. According to an embodiment, the magnesium is at a concentration in the range of about 70% to about 98%, preferably about 80% to about 95%, by volume of the metal alloy. According to certain embodiments, the metal alloy 50 undergoes corrosion in the presence of the wellbore fluid instead of undergoing galvanic corrosion in the presence of an electrolyte.

The metal alloy 50 comprises at least one other ingredient besides the magnesium. The at least one other ingredient can be selected from one or more metals, one or more non-metals, or combinations thereof. The one or more metals can be selected from the group consisting of lithium, sodium, potassium, rubidium, cesium, beryllium, calcium, strontium, barium, radium, aluminum, gallium, indium, tin, thallium, lead, bismuth, scandium, titanium, vanadium, chromium, manganese, thorium, iron, cobalt, nickel, copper, zinc, yttrium, zirconium, niobium, molybdenum, ruthenium, rhodium, palladium, praseodymium, silver, cadmium, lanthanum, hafnium, tantalum, tungsten, terbium, rhenium, osmium, iridium, platinum, gold, neodymium, gadolinium, erbium, oxides of any of the foregoing, and any combinations thereof. Preferably, the one or more metals is selected from the group consisting of lithium, beryllium, calcium, aluminum, tin, bismuth, scandium, chromium, manganese, thorium, nickel, copper, zinc, yttrium, zirconium, praseodymium, silver, cadmium, terbium, neodymium, gadolinium, erbium, oxides of any of the foregoing, and any combinations thereof. According to an embodiment, the one or more metals is neither radioactive nor unstable. The metal alloy can also contain the magnesium and the one or more non-metals. The one or more non-metals can be selected from the group consisting of graphite, carbon, silicon, boron nitride, and combinations thereof. The carbon can be in the form of carbon particles, fibers, nanotubes, or fullerenes. The graphite can be in the form of particles, fibers, or grapheme. The magnesium and the at least one other ingredient are in a solid solution and not in a partial solution or a compound where inter-granular inclusions may be present.

Preferably the magnesium and the at least one other ingredient are uniformly distributed throughout the metal alloy 50. It is to be understood that some minor variations in the distribution of particles of the magnesium and the at least one other ingredient can occur, but that it is preferred that the distribution is such that a homogenous solid solution of the metal alloy occurs. A solid solution is a solid-state solution of one or more solutes in a solvent. Such a mixture is considered a solution rather than a compound when the crystal structure of the solvent remains unchanged by addition of the solutes, and when the mixture remains in a single homogeneous phase.

According to an embodiment, the metal alloy 50 has a desired standard state reduction potential. The following is a partial list of standard state reduction potential for some metals. Magnesium has a reduction potential of −2.375. The inclusion of metals having a greater reduction potential, such as potassium or calcium could increase the overall reduction potential of the metal alloy 50. The inclusion of metals having a lower reduction potential, such as aluminum or manganese could decrease the overall reduction potential. As can be seen, the at least one other ingredient of the metal alloy and their relative concentrations or ratios can be selected to provide the desired reduction potential. The standard state reduction potential can play a very important role in determining the reaction rate of the metal alloy in the electrolyte.

| Half-Reaction | $E°_{red}$ |
|---|---|
| $K^+ + e^- \rightleftharpoons K$ | −2.924 |
| $Ba^{2+} + 2\ e^- \rightleftharpoons Ba$ | −2.90 |
| $Ca^{2+} + 2\ e^- \rightleftharpoons Ca$ | −2.76 |
| $Na^+ + e^- \rightleftharpoons Na$ | −2.7109 |
| $Mg^{2+} + 2\ e^- \rightleftharpoons Mg$ | −2.375 |
| $H_2 + 2\ e^- \rightleftharpoons 2\ H^-$ | −2.23 |
| $Al^{3+} + 3\ e^- \rightleftharpoons Al$ | −1.706 |
| $Mn^{2+} + 2\ e^- \rightleftharpoons Mn$ | −1.04 |
| $Zn^{2+} + 2\ e^- \rightleftharpoons Zn$ | −0.7628 |
| $Cr^{3+} + 3\ e^- \rightleftharpoons Cr$ | −0.74 |
| $S + 2\ e^- \rightleftharpoons S^{2-}$ | −0.508 |
| $2\ CO_2 + 2\ H^+ + 2\ e^- \rightleftharpoons H_2C_2O_4$ | −0.49 |
| $Cr^{3+} + e^- \rightleftharpoons Cr^{2+}$ | −0.41 |
| $Fe^{2+} + 2\ e^- \rightleftharpoons Fe$ | −0.409 |
| $Co^{2+} + 2\ e^- \rightleftharpoons Co$ | −0.28 |
| $Ni^{2+} + 2\ e^- \rightleftharpoons Ni$ | −0.23 |
| $Sn^{2+} + 2\ e^- \rightleftharpoons Sn$ | −0.1364 |
| $Pb^{2+} + 2\ e^- \rightleftharpoons Pb$ | −0.1263 |
| $Fe^{3+} + 3\ e^- \rightleftharpoons Fe$ | −0.036 |

Referring to FIGS. 3-7, the material that undergoes galvanic corrosion when in contact with the electrolyte can be an anode 51 of a galvanic system. The isolation device 30 can further include a cathode 52 of the galvanic system. The anode 51 partially or wholly dissolves when an electrically conductive path exists between the anode 51 and the cathode 52 and when both, the anode and the cathode are in contact with the electrolyte. According to these embodiments, the anode 51 and the cathode 52 are metals or metal alloys. The metal or metal alloy can be selected from the group consisting of, lithium, sodium, potassium, rubidium, cesium, beryllium, calcium, strontium, barium, radium, aluminum, gallium, indium, tin, thallium, lead, bismuth, scandium, titanium, vanadium, chromium, manganese, thorium, iron, cobalt, nickel, copper, zinc, yttrium, zirconium, niobium, molybdenum, ruthenium, rhodium, palladium, praseodymium, silver, cadmium, lanthanum, hafnium, tantalum, tungsten, terbium, rhenium, osmium, iridium, platinum, gold, neodymium, gadolinium, erbium, oxides of any of the foregoing, graphite, carbon, silicon, boron nitride, and any combinations thereof. Preferably, the metal or metal alloy is selected from the group consisting of magnesium, aluminum, zinc, beryllium, tin, iron, nickel, copper, oxides of any of the foregoing, and combinations thereof.

According to an embodiment, the anode 51 and the cathode 52 are different metals or metal alloys. By way of example, the anode 51 can be magnesium and the cathode 52 can be copper or nickel. As another example, the first material can be magnesium and the second material can be zinc. In another example, the first material can be an aluminum alloy and the second material can be iron. In yet another example, the first material can be aluminum and the second material can be gallium. Furthermore, the anode 51 can be a metal and the cathode 52 can be a metal alloy. The anode 51 and the cathode 52 can both be a metal; and the anode and cathode can both be a metal alloy. The anode and the cathode form a galvanic couple. For example, the cathode 52 is more noble than the anode.

Figure 3:
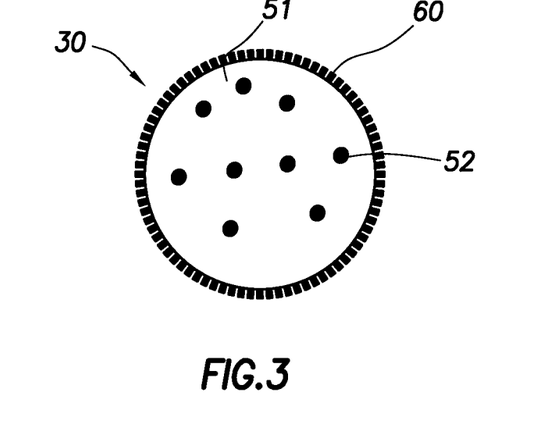
FIG. 3 depicts an isolation device having an anode matrix and cathode pieces within the matrix.

FIG. 3 depicts the isolation device 30 according to certain embodiments. According to this embodiment, the anode 51 forms a matrix of the portion of the wellbore device that contains the material. It is to be understood that the entire isolation device, for example, when the isolation device is a ball or ball seat, can be made of at least the anode and cathode. Moreover, only one or more portions of the isolation device can be made from at least the anode and cathode. As can be seen in FIG. 3, the cathode 52 can be in the form of pieces, wherein the pieces of the cathode are embedded within the matrix of the anode 51. The exact number or concentration of the pieces of the cathode 52 can be selected and adjusted to control the dissolution rate of the anode 51 such that at least the portion of the anode 51 material dissolves in the desired amount of time. For example, the higher the concentration of pieces of cathode 52 that are embedded within the matrix of the anode 51, generally the faster the rate of dissolution. Moreover, the pieces of the cathode 52 can be uniformly distributed throughout the matrix of the anode 51. This embodiment can be useful when a constant rate of dissolution of the anode is desired. The pieces of the cathode can also be non-uniformly distributed throughout the matrix of the anode such that different concentrations of the cathode are located within different areas of the matrix. By way of example, a higher concentration of the pieces of the cathode can be distributed closer to the outside of the matrix for allowing an initially faster rate of dissolution; whereas a lower concentration of the pieces can be distributed in the middle and inside of the matrix for allowing a slower rate of dissolution. By contrast, a higher concentration of the pieces of the cathode can be distributed in the middle and/or inside of the matrix for allowing a faster rate of dissolution at the end of dissolution; whereas a lower concentration of the pieces can be distributed closer to the outside of the matrix for allowing an initially slower rate of dissolution. Of course the concentration of pieces of the cathode can be distributed in a variety of ways to allow for differing rates of dissolution of the anode matrix.

Figure 4:
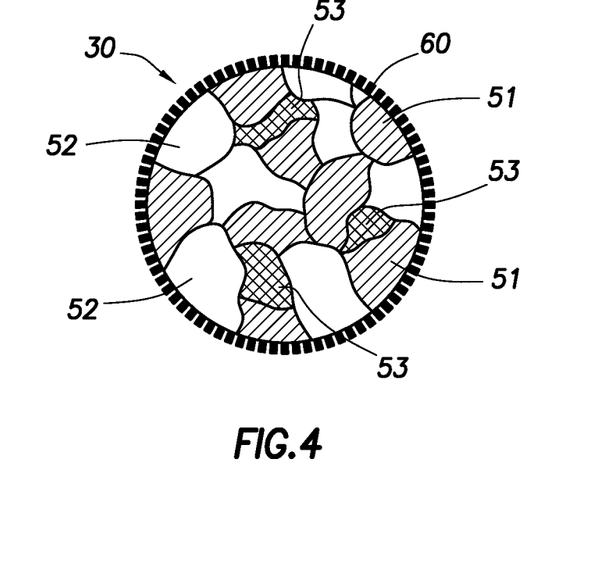
FIG. 4 depicts an isolation device having pieces of anode, cathode, and an optional additive.

FIG. 4 depicts the isolation device according to certain other embodiments. According to another embodiment, the anode 51 and cathode 52 are both pieces or nuggets of materials. The portion of the isolation device can also include a third material 53. The third material 53 can physically separate at least a portion of a surface of one or more pieces of the anode 51 from at least a portion of a surface of one or more pieces of the cathode 52. These embodiments can be useful when it is desired to use the distance between the anode and cathode as a way to control the rate of dissolution of the anode. The third material 53 may also limit the ionic conductivity or the electrical conductivity between the anode and cathode. According to an embodiment, the third material 53 is in the form of pieces. The third material can be selected from the group consisting of metals, non-metals, sand, plastics, ceramics, and polymers. Preferably, the third material includes a metal and/or a non-metal that is different from the metals making up the anode and cathode. The size and shape of the pieces of the third material 53 can be selected to provide a desired distance of the physical separation of the anode and cathode 51/52.

The third material 53 can also be an electrolytic compound. This embodiment can be useful when wellbore fluids are not electrolytes. The electrolytic compound is preferably soluble in the fluid that is located within the wellbore. The wellbore fluid can comprise, without limitation, freshwater, brackish water, saltwater, and any combination thereof. As stated above, the wellbore fluid can contain free ions in which the fluid is an electrolyte or it may not contain a sufficient amount of free ions to function as an electrolyte. According to an embodiment, the electrolytic compound is a water-soluble acid, base, or salt. The water-soluble salt can be a neutral salt, an acid salt, a basic salt, or an alkali salt. As used herein, an "acid salt" is a compound formed from the partial neutralization of a diprotic or polyprotic acid, and a "basic salt" and "alkali salt" are compounds formed from the neutralization of a strong base and a weak acid, wherein the base of the alkali salt is an alkali metal or alkali earth metal.

The third material 53 can also be a pH maintainer. The pH maintainer, for example a buffering agent, maintains the pH of a wellbore fluid surrounding the isolation device at a desired pH or range of pH values for a desired period of time, wherein the material that undergoes galvanic corrosion when in contact with the electrolyte is capable of dissolving at the desired pH or range of pH values. The desired pH or range of pH values can be predetermined and selected based on the material, such that the material is capable of dissolving at the desired pH or range of pH values. By way of example, magnesium hydrolyzes in water when the pH of the water is in the range from −2 to about 11. By way of another example, aluminum is passive (i.e., it does not decompose) when a surrounding fluid has a pH in the range of about 4 to about 8.5, but will decompose at two different pH ranges of −2 to about 4 and about 8.5 to 14.

Figure 5:
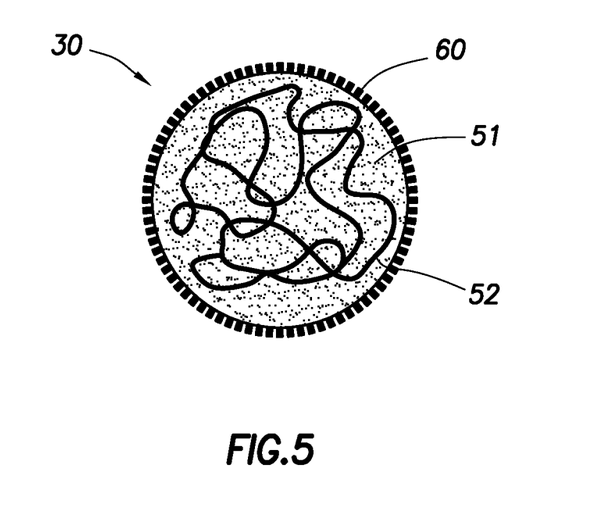
FIGS. 5 and 6 depict an isolation device having an anode matrix and cathode fibers within the matrix according to certain embodiments.
Figure 6:
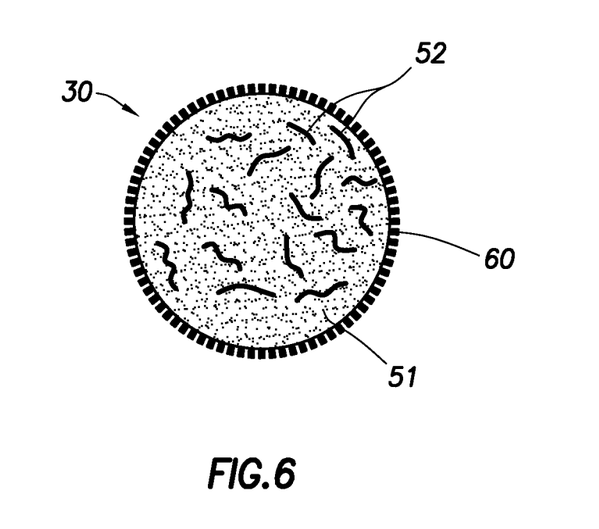

Referring to FIGS. 5 and 6, the cathode 52 can be a fiber (as shown in FIG. 5) or a plurality of discrete fibers (as shown in FIG. 6). As used herein, the term "fiber" and all grammatical variations thereof means a solid that is characterized by having a high aspect ratio of length to diameter. For example, a fiber can have an aspect ratio of length to diameter from greater than about 2:1 to about 5,000:1. Preferably, the cathode 52 fiber is a graphite fiber, a carbon fiber, a silicon carbide fiber, or a boron fiber. The fiber can be a nanotube. For example, the fiber can be a carbon nanotube, a titanium oxide nanotube, or combinations of a carbon nanotube with either, aluminum, copper, magnesium, nickel, titanium, or tin. As can be seen in FIG. 5, the fiber can be a continuous fiber that is distributed and wound throughout the matrix of the anode 51. The distribution pattern can be selected to achieve a desired concentration of the cathode 52 to the anode 51. According to an embodiment, the concentration of anode 51 is greater than the concentration of the cathode 52. The fiber can also be woven. A woven fiber can increase the overall strength of the portion of the isolation device. The type of weave can also be selected to achieve a desired strength of the portion of the isolation device, especially depending on the exact metal and/or metal alloys making up the anode and cathode 51/52.

As can be seen in FIG. 6, the cathode 52 can be a plurality of fibers. The fibers can be discrete fibers (i.e., a non-continuous strand of fiber). It is to be understood that some of the discrete fibers can be in physical contact with other discrete fibers. The fibers can have a length in the range of about 6 to about 25 millimeters (mm). Preferably, the fibers have a length less than about 6 mm, more preferably in the range of about 3 mm to less than about 6 mm. Some or all of the plurality of fibers can be fibrillated fibers. As used herein, the term "fibrillated fibers" and all grammatical variations thereof means fibers bearing sliver-like fibrils along the length of the fiber. The fibrils extend from the fiber, often referred to as the "core fiber," and have a diameter significantly less that the core fiber from which the fibrils extend. The fibrils can be in a split, barbed, or pulped pattern.

Figure 7:
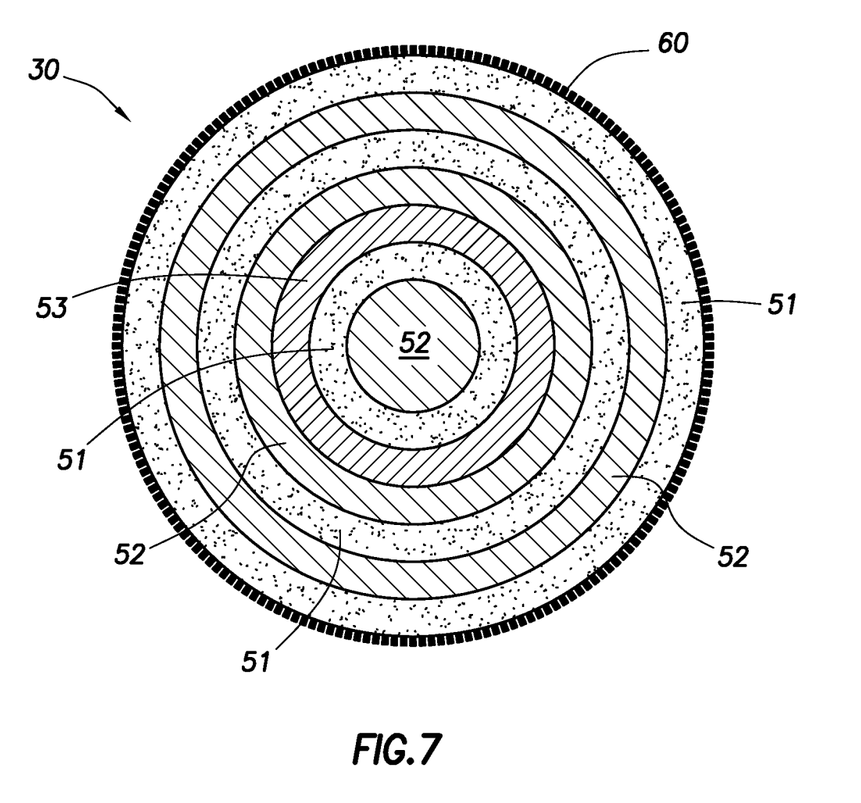
FIG. 7 depicts an isolation device of a nanolaminate composite of anode and cathode.

Referring to FIG. 7, the portion of the isolation device that comprises the material that undergoes galvanic corrosion when in contact with the electrolyte can be a nanolaminate. The portion of the isolation device can also comprise a micro nanolaminate. As used herein, the term "nanolaminate" means a multi-layered structure, wherein the layers of the nanolaminate have an average thickness in the range of 1 to 50,000 nanometers. As used herein, the term "micro nanolaminate" means a multi-layered structure, wherein the layers of the micro nanolaminate have an average thickness in the range from 1 nanometer to 999 nanometers. The term "micro nanolaminate" is a subgroup of the term "nanolaminate." The nanolaminate comprises two or more layers of the anode 51 and two or more layers of the cathode 52. The nanolaminate can also comprise a plurality of layers of the anode 51 and a plurality of layers of the cathode 52. The two or more layers of the cathode 52 can be a continuous layer, a discontinuous layer, or a porous layer. The layers of the cathode 52 can also include nanoparticles of the anode 51. This embodiment may be useful to increase the dissolution rate of the anode 51.

According to an embodiment, the nanolaminate further includes at least one layer of a third material 53. The layer of the third material 53 can be a bonding agent for bonding the layers of the anode 51 to the layers of the cathode 52. This embodiment can be useful during the manufacturing process to provide a suitable bond between all the layers of the nanolaminate. Examples of materials suitable for use as a bonding third material include, but are not limited to, aluminum, magnesium, copper, platinum, gold, silver, nickel, iron, chromium, molybdenum, tungsten, stainless steel, zirconium, tin, titanium, indium, and oxides of any of the foregoing. It may be desirable to use the oxide of the metal to create a better bond between the layers of the anode and cathode 51/52. The layer(s) of the third material 53 can also be a filler material instead of a bonding layer. A filler material can create a greater distance between the layers of the anode and cathode 51/52.

There are several factors that can affect the rate of dissolution of the anode 51. According to an embodiment, the metal alloy 50 material or the anode 51 material and the cathode 52 are selected such that the at least a portion of the material dissolves in the desired amount of time. By way of example, the greater the difference between the cathode's anodic index and the anode's anodic index, the faster the rate of dissolution. By evaluating the difference in the anodic index of the first and second materials one of ordinary skill in the art will be able to determine the rate of dissolution of the anode in a given electrolyte. For a metal alloy material (e.g., a magnesium alloy), the inclusion of calcium, cadmium, silver, and zinc have a moderate accelerating effect on the dissolution rate of the magnesium, while cobalt, copper, iron, and nickel have an extremely severe accelerating rate on the dissolution of the magnesium. Therefore, according to an embodiment, the other metals or non-metals of the metal alloy 50 are selected such that the material dissolves in the desired amount of time.

Another factor that can affect the rate of dissolution of the anode 51 is the proximity and concentration of the anode 51 to the cathode 52. The exact number of pieces, nuggets, fiber, or layers, or the concentration of the cathode 52 can be selected and adjusted to control the dissolution rate of the anode 51 such that at least the portion of the material dissolves in the desired amount of time.

Another factor that can affect the rate of dissolution of the material is the concentration of the electrolyte and the temperature of the electrolyte. Generally, the higher the concentration of the electrolyte, the faster the rate of dissolution of the material, and the lower the concentration of the electrolyte, the slower the rate of dissolution. Moreover, the higher the temperature of the electrolyte, the faster the rate of dissolution of the material, and the lower the temperature of the electrolyte, the slower the rate of dissolution.

Figure 8:
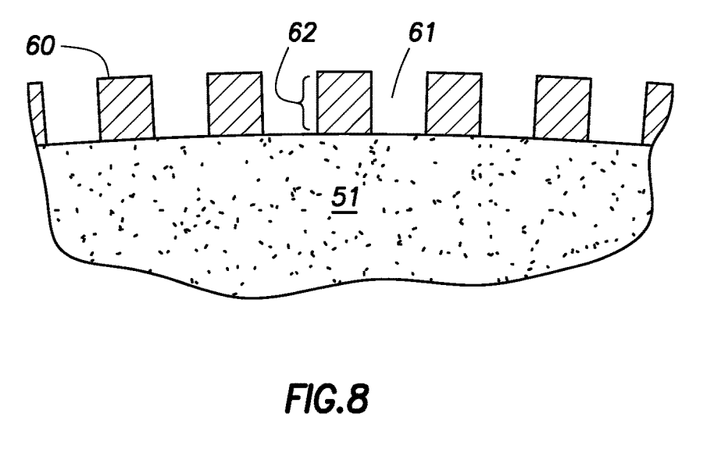
FIG. 8 depicts the porous surface of the isolation devices of FIGS. 2-7.

The surface of the portion of the isolation device is altered via a surface treatment, and wherein the altered surface delays corrosion of at least a portion of the material for a desired amount of time. Unlike prior coating techniques, a surface treatment alters the surface of the material that undergoes corrosion when in contact with the wellbore fluid or galvanic corrosion in the presence of the electrolyte such that concerns regarding detachment of the coating or a loss of strength are eliminated. Referring to FIG. 8, the surface treatment produces an altered surface layer 60. According to certain embodiments, the altered surface layer 60 is an anodizing layer. In certain embodiments, the altered surface layer 60 can contain pores 61.

There are a variety of surface treatments that form an altered surface layer 60 onto the surface. The treatments can broadly fall into chemical or physical methods. Examples of a chemical method are electrochemical treatments, including electroplating also known as electrodeposition, electroless electroplating, anodic oxidation, anodic plasma-chemical, and chemical vapor deposition (CVD). In electrochemical treatments, the nature of the anodizing process is based upon the electrochemical principle that when a current is passed through an electrolyte in which a metal anode is employed, the anion migrates to the anode. The anion is then discharged with a loss of one or more electrons. In an aqueous solution, the anion consists in part of oxygen, which is adsorbed by the metal or metal alloy surface. As adsorption via chemisorption proceeds, the surface is reconstructed, forming a contiguous film of anodic oxide. The resultant oxide is slightly soluble in the electrolyte. The slightly soluble characteristic of the film causes localized dissolution of the forming film. Pores are thus formed in the film, which are wide enough to allow continuous access of the current via the electrolyte to the metal or metal alloy. Anodic film growth continues and is gradually retarded as the film grows thicker and the electrical resistance increases. When the rate of film growth has decreased until it is equal to the rate of dissolution of the film in the electrolyte, the film thickness remains constant.

Usually an electrolytic cell (consisting of two electrodes, an electrolyte, and an external source of current) is used for electrodeposition. In contrast, in electroless electrochemical deposition only one electrode and no external source of electric current is used. However, the solution for the electroless process needs to contain a reducing agent that can form the anodizing layer. In principle any water-based reducer can be used although the redox potential of the reducer half-cell must be high enough to overcome the energy barriers inherent in liquid chemistry. Electroless nickel plating, for example, uses hypophosphite as the reducer while plating of other metals like silver, gold and copper typically use low molecular weight aldehydes. A major benefit of electroless electroplating over electroplating is that power sources and plating baths are not needed, thus reducing the cost of production. The technique can also plate diverse shapes and types of surface. The downside is that the plating process is usually slower and cannot create as thick an anodizing layer as other processes.

Examples of electroless electroplating include chromating and chromium-free systems. In both cases, the material of the portion of the isolation device that undergoes galvanic corrosion when in contact with the electrolyte is immersed in an electrolyte, which contains a reducing agent of chromate or a non-chromate compound capable of forming the anodizing layer on the surface. For example, a chromate process can involve immersing and agitating the portion of the isolation device in an electrolyte solution containing sodium dichromate and nitric acid and optionally also sulphuric acid. Magnesium fluoride or calcium fluoride can also be used instead of the nitric or sulphuric acids. The temperature of the electrolyte and the length of time the object is immersed can help determine the thickness and porosity of the anodizing layer that is formed. In a chromium-free system, a different reducing agent, such as potassium permanganate or permanganate-phosphate solutions are used in conjunction with sodium or ammonium salts containing anions of vandate, molybdate, manganese, or wolframate (also known as tungstate). Vandate, molybdate, and wolframate are compounds containing an oxoanion with vanadium, molybdenum, and tungsten, respectively, in their highest oxidation state.

Figure 9:
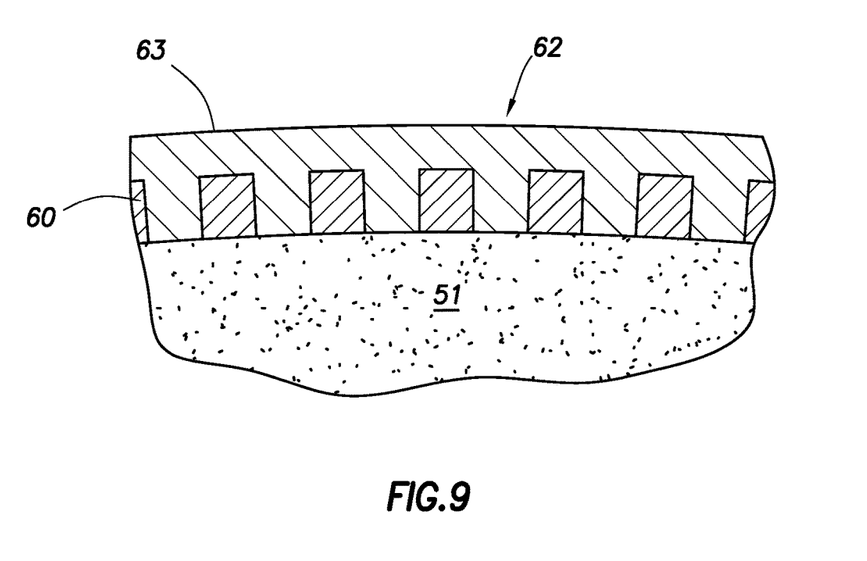
FIG. 9 depicts the surface of FIG. 8 with a sealant that fills the pores of the surface.

Anodic oxidation involves the application of an electrical bias at relatively low currents while the substrate is immersed in an acid bath. Anodization changes the microscopic texture of the surface and changes the crystal structure of the metal or metal alloy near the surface. The films can be very dense and stable, with a variety of microstructural characteristics. The phase formation, thickness, and pore size of the films depended strongly on the applied voltage and anodizing time. Thick coatings are normally very porous, so a sealant 63, as shown in FIG. 9, can be applied to the anodizing layer 60 to delay dissolution of the material of the isolation device for the desired amount of time.

Anodic plasma-chemical treatments, such as anodic spark deposition (ASD), anodic spark discharge, microarc oxidation (MO), electrical breakdown, and plasma-chemical oxidation including plasma-assisted chemical vapor deposition (including organic coatings, for example plasmas fed with hexamethyldisiloxane-oxygen), is another type of chemical surface treatment. This process consists of combining anodic processes with plasma discharges in the electrolyte. The process can be carried out at relatively high voltages (i.e., greater than 100 volts) and with various types of power supplies, such as direct current (DC), alternating current (AC), three-phase current, or pulsed current. This provides an anodizing layer with a crystalline nature. This process can produce an increase in the oxide layer of up to 150 micrometers (μm) and the layer hardness increases. This process can be easy to use without additional equipment, such as vacuum equipment. Suitable electrolytes for this process include aqueous solutions—preferably with the anions fluoride, phosphate, borate, silicate, and aluminate, which work in pH ranges of about 7 to 14. In some instances, up to about 50% of the anodizing layer forms below the surface and the other portion forms a layer above the original level of the metal or metal alloy. Due to the high amount of dissipated energy that results from the exchange of energy within the electrolyte, the electrolyte may have to be cooled, and care should be taken to protect against accidental contact with the high voltage.

Chemical vapor deposition (CVD) involves exposing a substrate to one or more volatile precursors, which react and/or decompose on the substrate surface to produce the desired deposit. Frequently, volatile by-products are also produced, which are removed by gas flow through the reaction chamber. The various substrates that can be deposited onto the metal or metal alloy include, but are not limited to, silicon, carbon fiber, carbon nanofibers, fluorocarbons, filaments, carbon nanotubes, silicon dioxide, silicon-germanium, tungsten, silicon carbide, silicon nitride, silicon oxynitride, titanium nitride, and various high-k dielectrics. Any of the following types of CVD treatments can be used. CVD surface treatments can be classified by the operating pressure, such as: atmospheric pressure CVD (APCVD)—CVD at atmospheric pressure; low-pressure CVD (LPCVD)—CVD at sub-atmospheric pressures, where reduced pressures tend to reduce unwanted gas-phase reactions and improve film uniformity across the surface; ultrahigh vacuum CVD (UHVCVD)—CVD at very low pressure, typically below $10^{-6}$ pascals. CVD treatments can also be classified by the physical characteristics of the vapor produced, such as: aerosol assisted CVD (AACVD)—CVD in which the precursors are transported to the metal or metal alloy by means of a liquid/gas aerosol, which can be generated ultrasonically; direct liquid injection CVD (DLICVD)—CVD in which the precursors are in liquid form (liquid or solid dissolved in a convenient solvent). Other methods include: plasma methods, including microwave plasma-assisted CVD (MPCVD); plasma-enhanced CVD (PECVD)—CVD that utilizes plasma to enhance chemical reaction rates of the precursors, wherein PECVD processing allows deposition at lower temperatures, which allow for the deposition of organic coatings, such as plasma polymers; remote plasma-enhanced CVD (RPECVD)—similar to PECVD except that the substrate is not directly in the plasma discharge region, which allows processing temperatures down to room temperature; atomic-layer CVD (ALCVD)—deposits successive layers of different substances to produce layered, crystalline films; combustion chemical vapor deposition (CCVD)—an open-atmosphere, flame-based technique for depositing high-quality thin films and nanomaterials; hot filament CVD (HFCVD)—uses a hot filament to chemically decompose the source gases; and photo-initiated CVD (PICVD)—uses UV light to stimulate the chemical reactions.

Examples of physical methods include physical vapor deposition (PVD) (including arc-PVD and arc-PVD ion implantation), and laser feeding. Physical vapor deposition (PVD) involves a variety of vacuum deposition methods used to deposit layers onto a surface by the condensation of a vaporized form of the desired layer substance onto the metal or metal alloy surface. The coating method involves purely physical processes such as high-temperature vacuum evaporation with subsequent condensation, or plasma sputter bombardment rather than involving a chemical reaction at the surface to be coated as in chemical vapor deposition. Variants of PVD include: cathodic arc deposition—in which a high-power electric arc discharged at the target substance blasts away some of the substance into highly ionized vapor to be deposited onto the surface; electron beam physical vapor deposition—in which the substance to be deposited is heated to a high vapor pressure by electron bombardment in "high" vacuum and is transported by diffusion to be deposited by condensation on the (cooler) surface; evaporative deposition—in which the substance to be deposited is heated to a high vapor pressure by electrically resistive heating in "low" vacuum; pulsed laser deposition—in which a high-power laser ablates the substance into a vapor; and sputter deposition—in which a glow plasma discharge (usually localized around the "target substance" by a magnet) bombards the substance, sputtering some away as a vapor for subsequent deposition.

Some of the advantages to PVD processes include: the layers deposited are sometimes harder and more corrosion resistant than layers applied by an electroplating process; the layer can have high temperature and good impact strength, excellent abrasion resistance and can be so durable that a sealant may not be necessary; a variety of inorganic and some organic substances can be used; the layer can be more environmentally friendly than other coating processes such as electroplating and painting; and more than one technique can be used to deposit a given substance onto the surface.

During laser feeding, a strong circulation of the liquid metal takes place and after the laser bundle remelting—its rapid solidification onto the surface. Three zones occur in the surface layer of the metal or metal alloys: a rich zone with unsolved particles fed in the surface layers, a remelting zone (RZ), and a heat affected zone (HAZ). Both RZ and HAZ zones, depending on the concentration of the substance deposited onto the surface, laser power applied, are of different thickness and shape. For example, the power of the laser within the range 1.2-2.0 kilowatts provides the possibility to obtain flat regular remelting welds with a highly smooth surface.

FIG. 8 depicts the altered surface layer 60 as being porous. The cross-sectional size of the pores 61 can vary and depend on the parameters of the surface treatment, for example time or temperature. The amount of porosity can also vary depending on the exact surface treatment used and the parameters of the treatment. The altered surface layer 60, whether porous or non-porous, can have a specific thickness 62. Of course, the surface can be altered to provide two or more altered surface layers 60. The overall thickness 62 of all the altered surface layers 60 can be selected such that the portion of the material dissolves in the desired amount of time. By way of example, the greater the thickness 62 of the altered surface layer 60, the longer it will take for the electrolyte in the wellbore 11 to migrate through the layer and come in contact with the material (e.g., the metal alloy 50 or the anode 51 and cathode 52). Therefore, the thickness can be adjusted, based in part on the pore size, such that the portion of the material dissolves in the desired amount of time.

In some embodiments, it may be desirable or necessary to include the sealant 63 placed over the altered surface layer 60. The sealant 63 can be used to fill the pores 61 and possibly also bond to the layer. The sealant 63 can be used when due to the amount of porosity, the cross-sectional size of the pores, and/or the thickness of the layer, the material would undergo dissolution in the electrolyte before the desired time. The sealant 63 can be a degradable substance (such as a dissolvable plastic), a substance that melts at the bottomhole temperature of the wellbore (such as a fusible alloy, grease, or waxes), or a flowable substance that would only provide protection while the isolation device is not in motion in the wellbore. Examples of dissolvable plastics include polylactic acid, polyglycolic acid, polyvinyl alcohol, and acetates. Examples of other degradable substances include boric acid, salts, and sugar. For example, if the sealant is polylactic acid, then the sealant would protect the metal alloy or anode from an acid treatment. Once the wellbore fluid caused the degradation of the polylactic acid sealant, then the degradation by-product of the decomposing polylactic acid sealant would enhance the degradation of the material. The desired amount of time can be in the range of about 30 minutes to about 1 month.

According to an embodiment, the portion of the isolation device is capable of withstanding a specific pressure differential for a desired amount of time. Preferably, the altered surface is also capable of withstanding the same pressure differential as the portion of the isolation device. As used herein, the term "withstanding" means that the substance does not crack, break, or collapse. The pressure differential can be the downhole pressure of the subterranean formation 20 across the device. As used herein, the term "downhole" means the location of the wellbore where the portion of the isolation device is located. Formation pressures can range from about 1,000 to about 30,000 pounds force per square inch (psi) (about 6.9 to about 206.8 megapascals "MPa"). The pressure differential can also be created during oil or gas operations. For example, a fluid, when introduced into the wellbore 11 upstream or downstream of the substance, can create a higher pressure above or below, respectively, of the isolation device. Pressure differentials can range from 100 to over 10,000 psi (about 0.7 to over 68.9 MPa). The desired amount of time can be at least 30 minutes. The desired amount of time can also be in the range of about 30 minutes to 14 days, preferably 30 minutes to 2 days, more preferably 4 hours to 24 hours. The inclusion of aluminum, zinc, zirconium, and/or thorium into the layers of the nanolaminate can promote precipitation hardening and strengthen the nanolaminate.

The methods can further include the step of placing the isolation device 30 in a portion of the wellbore 11, wherein the step of placing is performed prior to the step of contacting or allowing the isolation device to come in contact with the electrolyte. More than one isolation device can also be placed in multiple portions of the wellbore. The methods can further include the step of removing all or a portion of the dissolved material (e.g., the metal alloy 50 or the anode 51) and/or all or a portion of the cathode 52 or the third material 53, wherein the step of removing is performed after the step of allowing at least a portion of the material to dissolve. The step of removing can include flowing the dissolved material and/or the cathode 52 or third material 53 from the wellbore 11. According to an embodiment, a sufficient amount of the material dissolves such that the isolation device is capable of being flowed from the wellbore 11. According to this embodiment, the isolation device should be capable of being flowed from the wellbore via dissolution of the material, without the use of a milling apparatus, retrieval apparatus, or other such apparatus commonly used to remove isolation devices.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of removing a wellbore isolation device comprising:
    contacting or allowing the wellbore isolation device to come in contact with a wellbore fluid,
        wherein at least a portion of the wellbore isolation device comprises a material that dissolves via corrosion when in contact with the wellbore fluid,
        wherein the surface of the portion of the isolation device is altered via a surface treatment that modifies the composition of a treated portion of the isolation device to create an altered surface, wherein the altered surface delays corrosion of at least a portion of the material for a desired amount of time, wherein the altered surface is a layer that contains pores, wherein the wellbore isolation device further comprises a sealant placed over the altered surface, wherein the sealant fills the pores; and
    causing or allowing at least the portion of the material to dissolve,
    wherein the material is a metal alloy, wherein the metal alloy undergoes galvanic corrosion in the presence of an electrolyte without a distinct cathode being present,
    wherein the metal alloy comprises magnesium as the metal, and
    wherein the magnesium is in a concentration of at least 85% by volume of the metal alloy.

2. The method according to claim 1, wherein the wellbore fluid is selected from the group consisting of, solutions of an acid, a base, a salt, and combinations thereof.

3. The method according to claim 1, wherein the isolation device is capable of restricting or preventing fluid flow between a first wellbore interval and a second wellbore interval.

4. The method according to claim 1, wherein isolation device is a ball, a ball seat, a plug, a bridge plug, a wiper plug, a frac plug, a packer, or a plug for a base pipe.

5. The method according to claim 1, wherein the portion of the isolation device is the mandrel of a packer or plug, a spacer ring, a slip, a wedge, a retainer ring, an extrusion limiter or backup shoe, a mule shoe, a ball, a flapper, a ball seat, a sleeve, or any other downhole tool or component of a downhole tool used for zonal isolation.

6. The method according to claim 1, wherein the material is an anode of a galvanic system, and wherein the at least the portion of the isolation device further comprises a cathode of the galvanic system.

7. The method according to claim 6, wherein the anode and the cathode are a non-metal, metal, or metal alloy, and wherein the metal or metal of the metal alloy is selected from the group consisting of magnesium, aluminum, zinc, cerium, beryllium, tin, iron, nickel, copper, titanium, oxides of any of the foregoing, and combinations thereof.

8. The method according to claim 1, wherein the altered surface is an anodizing layer.

9. The method according to claim 1, wherein the sealant is a degradable substance.

10. The method according to claim 9, wherein the sealant initially protects the altered surface from an acid treatment.

11. The method according to claim 1, wherein the surface treatment is a chemical or physical method.

12. The method according to claim 1, wherein the altered surface has a specific thickness.

13. The method according to claim 12, wherein the surface is altered to provide two or more altered surface layers.

14. The method according to claim 13, wherein the thickness of the altered surface or the two or more altered surface layers is selected such that the portion of the material dissolves in the desired amount of time.

15. The method according to claim 1, further comprising the step of placing the isolation device into a portion of the wellbore, wherein the step of placing is performed prior to the step of contacting or allowing the isolation device to come in contact with the electrolyte.

16. The method according to claim 1, further comprising the step of removing all or a portion of the dissolved anode, wherein the step of removing is performed after the step of causing or allowing at least the portion of the layers of the anode to dissolve.

17. A wellbore isolation device comprising:
    a material that dissolves via corrosion when in contact with a wellbore fluid, an altered surface, wherein the altered surface comprises the material after being subjected to a surface treatment that modifies the composition of a treated portion of the wellbore isolation device, wherein the altered surface delays corrosion of the material for a desired amount of time, wherein the altered surface is a layer that contains pores, wherein the wellbore isolation device further comprises a sealant placed over the altered surface, wherein the sealant fills the pores; and
    wherein the material is a metal alloy that is operable to undergo galvanic corrosion in the presence of an electrolyte without a distinct cathode being present, the metal alloy comprising magnesium in a concentration of at least 85% by volume of the metal alloy.

* * * * *